(12) United States Patent
Quitmeyer

(10) Patent No.: US 9,573,218 B2
(45) Date of Patent: Feb. 21, 2017

(54) WELDING SYSTEM FOR ATTACHING FIRING TIPS TO SPARK PLUG ELECTRODES

(71) Applicant: Federal-Mogul Ignition Company, Southfield, MI (US)

(72) Inventor: Frederick J. Quitmeyer, Rochester Hills, MI (US)

(73) Assignee: Federal-Mogul Ignition Company, Southfield, MI (US)

( * ) Notice: Subject to any disclaimer, the term of this patent is extended or adjusted under 35 U.S.C. 154(b) by 505 days.

(21) Appl. No.: 14/028,269

(22) Filed: Sep. 16, 2013

(65) Prior Publication Data

US 2014/0083982 A1 Mar. 27, 2014

Related U.S. Application Data

(60) Provisional application No. 61/705,901, filed on Sep. 26, 2012.

(51) Int. Cl.
*B23K 11/26* (2006.01)
*B23K 11/36* (2006.01)
*B23K 11/00* (2006.01)
*B23K 37/04* (2006.01)
*H01T 21/00* (2006.01)
*H01T 13/39* (2006.01)
*H01T 21/02* (2006.01)

(52) U.S. Cl.
CPC .............. *B23K 11/004* (2013.01); *B23K 11/26* (2013.01); *B23K 11/36* (2013.01); *B23K 37/0417* (2013.01); *H01T 13/39* (2013.01); *H01T 21/00* (2013.01); *H01T 21/02* (2013.01)

(58) Field of Classification Search
CPC ....... B23K 11/004; B23K 11/26; B23K 11/36; B23K 37/0417
USPC .......................... 219/76.1–85.16, 119–121.33
See application file for complete search history.

(56) References Cited

U.S. PATENT DOCUMENTS

| | | | | |
|---|---|---|---|---|
| 3,514,567 A | * | 5/1970 | Strang | B08B 15/04 219/137.41 |
| 4,161,642 A | * | 7/1979 | Arnason | B23K 9/013 219/138 |
| 4,795,876 A | * | 1/1989 | Nustede | B23K 11/002 219/117.1 |
| 5,554,908 A | | 9/1996 | Kuhnert et al. | |
| 5,841,105 A | * | 11/1998 | Haczynski | B23K 9/295 219/124.02 |
| 6,080,029 A | | 6/2000 | Johnson et al. | |
| 6,132,277 A | * | 10/2000 | Tribble | H01T 21/02 313/141 |

(Continued)

*Primary Examiner* — Michael Laflame, Jr.
(74) *Attorney, Agent, or Firm* — Reising Ethington, P.C.

(57) ABSTRACT

A welding system for welding small precious metal firing tips to spark plug electrodes, such as ground and/or center electrodes. According to one embodiment, the welding system includes a firing tip storage assembly and a firing tip welding assembly, where the firing tip storage assembly uses pressurized gas introduced at the bottom of a part container to float or lift the firing tips so that the firing tip welding assembly can more easily acquire them with a vacuum-driven nozzle that also doubles as a welding electrode. The firing tip welding assembly is mounted to a robotic apparatus that can index or move the firing tip welding assembly between the firing tip storage assembly, a welding station and/or any other suitable positions.

15 Claims, 2 Drawing Sheets

(56) References Cited

U.S. PATENT DOCUMENTS

| | | |
|---|---|---|
| 7,045,939 B2 | 5/2006 | Teramura et al. |
| 8,026,654 B2 | 9/2011 | Kowalski et al. |
| 8,052,495 B2 | 11/2011 | Kato et al. |
| 8,098,004 B2 | 1/2012 | Kato et al. |
| 2010/0101073 A1 | 4/2010 | Kato et al. |
| 2012/0086326 A1 | 4/2012 | Niessner et al. |
| 2013/0134135 A1* | 5/2013 | Mantei ................ B23K 11/006 219/80 |

* cited by examiner

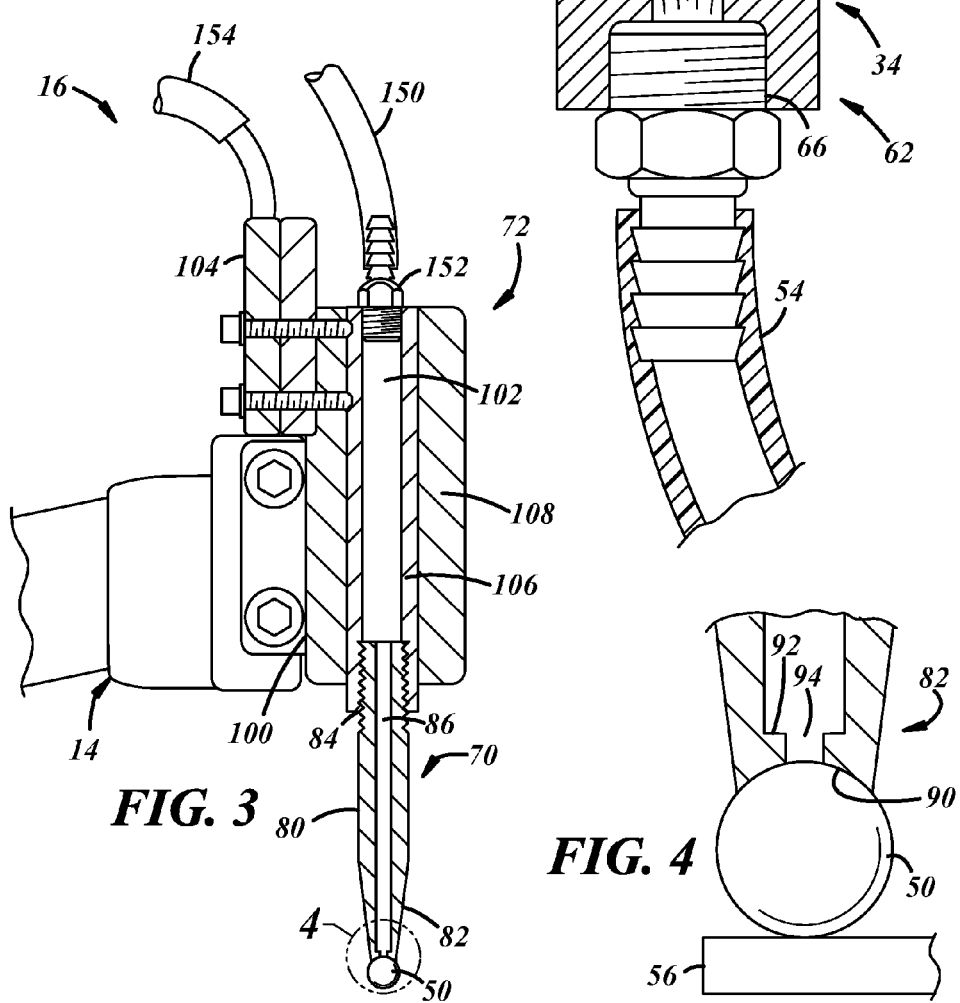

WELDING SYSTEM FOR ATTACHING FIRING TIPS TO SPARK PLUG ELECTRODES

REFERENCE TO RELATED APPLICATIONS

This application claims the benefit of U.S. Provisional Ser. No. 61/705,901 filed on Sep. 26, 2012, the entire contents of which are incorporated herein.

TECHNICAL FIELD

This invention generally relates to a welding system and, more particularly, to a welding system that can attach small precious metal firing tips to spark plug electrodes.

BACKGROUND

It is common practice to affix small firing tips, such as those made from precious metals, to spark plug electrodes. Such firing tips are often in a ball or spherical form, prior to attachment, and are stored in some type of ball feeder or other part storage device. During manufacturing, the small precious metal balls are provided by the ball feeder and are positioned on a spark plug electrode, after which a welding device moves into place to weld the ball to the electrode. Most ball welding systems of this type utilize gravity to position and/or locate the small precious metal balls on the spark plug electrode.

Those skilled in the art will appreciate that conventional ball welding systems, like that described above, can face certain challenges in high-precision, high-volume manufacturing environments. For instance, due to the small size of the precious metal balls and the spark gaps involved, extremely accurate positioning is usually required. Such accuracy can sometimes be difficult to achieve at a high-volume manufacturing pace, particularly when using ball welding systems that rely on gravity to position and/or locate the precious metal balls on the spark plug electrodes.

SUMMARY

According to one aspect, there is provided a welding system that comprises: a firing tip storage assembly with a gas bubbler fluidly coupled to a part container, where the gas bubbler provides pressured gas from a gas supply to the part container and the part container stores a plurality of firing tips; and a firing tip welding assembly with an attachment piece both fluidly and electrically coupled to a welding electrode, where the attachment piece provides vacuum pressure from a vacuum source to the welding electrode and provides welding current from a power supply to the welding electrode; wherein the welding system is configured so that the pressurized gas lifts the plurality of firing tips within the part container while the welding electrode acquires one of the firing tips from the part container using the vacuum pressure.

According to another aspect, there is provided a firing tip storage assembly that comprises: a gas bubbler fluidly coupled to a gas supply; and a part container fluidly coupled to the gas bubbler with one or more gas openings and an interior for storing a plurality of firing tips; wherein the firing tip storage assembly is configured so that pressurized gas from the gas supply is provided from the gas bubbler to the part container through the one or more gas openings and causes the plurality of firing tips to be lifted within the interior of the part container.

According to yet another aspect, there is provided a firing tip welding assembly that comprises: an attachment piece with a passageway fluidly coupled to a vacuum source and an electrical connection portion electrically coupled to a power supply; and a welding electrode with an elongated body electrically coupled to the electrical connection portion and a passageway with an opening fluidly coupled to the passageway of the attachment piece and located at a tip end of the welding electrode; wherein the firing tip welding assembly is configured so that vacuum pressure for acquiring a firing tip is provided from the vacuum source to the opening through the passageway of the attachment piece and is configured so that welding current for welding the firing tip to a spark plug electrode is provided from the power supply to the tip end of the welding electrode through the electrical connection portion.

BRIEF DESCRIPTION OF THE DRAWINGS

Preferred exemplary embodiments will hereinafter be described in conjunction with the appended drawings, wherein like designations denote like elements, and wherein:

FIG. 2 is an enlarged cross-sectional view of an exemplary firing tip storage assembly, such as the one shown in FIG. 1;

FIG. 3 is an enlarged cross-sectional view of an exemplary firing tip welding assembly, such as the one shown in FIG. 1; and FIG. 4 is an enlarged cross-sectional view of an exemplary tip end of a firing tip welding assembly, such as the one shown in FIG. 3.

DETAILED DESCRIPTION OF THE PREFERRED EMBODIMENTS

Figure 1:
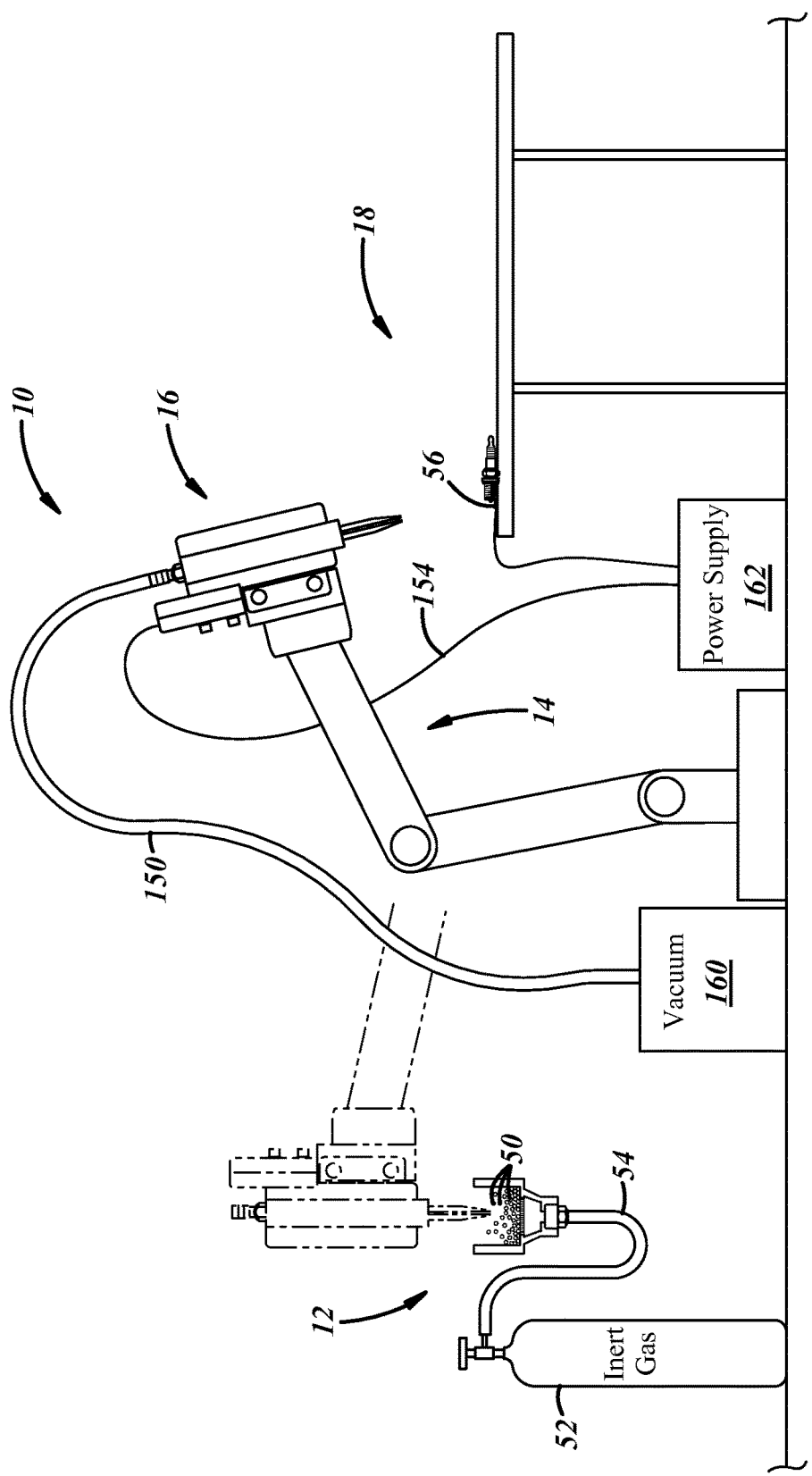
FIG. 1 is a schematic view of an exemplary welding system for attaching a firing tip to a spark plug electrode, the welding system generally includes a firing tip storage assembly, a robotic apparatus, and a firing tip welding assembly.

The welding system described herein may be used to rapidly, accurately and effectively weld firing tips to spark plug electrodes, such as ground and/or center electrodes. According to the exemplary embodiment depicted in FIG. 1, welding system 10 includes a firing tip storage assembly 12, a robotic apparatus 14, and a firing tip welding assembly 16 and the welding system attaches a firing tip in the form of a small precious metal ball to a spark plug electrode. Firing tip storage assembly 12 uses pressurized gas that is introduced at the bottom of a part container to float or lift the firing tips—somewhat like a lottery ball machine—so that firing tip welding assembly 16 can more easily seize or acquire the firing tips with a vacuum-driven nozzle that also doubles as a welding electrode. Firing tip welding assembly 16 is mounted to and carried by robotic apparatus 14 so that the robotic apparatus can index or move the firing tip welding assembly between firing tip storage assembly 12, welding station 18 and/or any other suitable positions. This type of system may eliminate the need for certain types of gravity-fed ball feeders, which can be difficult to use in some high-volume manufacturing environments, as already discussed. Skilled artisans will appreciate that other embodiments are also possible, as the present welding system is not limited to the exemplary embodiments described and illustrated herein.

Firing tip storage assembly 12 stores and maintains the firing tips so that they are easily and readily available to firing tip welding assembly 16 during manufacture. With reference to FIG. 2, which is an enlarged cross-sectional view of an exemplary firing tip storage assembly, assembly 12 generally includes a part container 32 fluidly coupled to a gas bubbler 34. The phrase "fluidly coupled," as used herein, broadly refers to two or more components that are connected, joined or otherwise coupled together so that fluids, including gases and/or liquids, can pass from one component to another.

Part container 32 may be any type of receptacle or container that can hold a suitable number of firing tips 50 and, according to this particular embodiment, it is cylindrical or rectangular in shape and includes an open upper end 40, a closed lower end 42, and side walls 44 that define an interior space within. Upper end 40 is open in order for firing tip welding assembly 16 to have access to the interior of part container 32 where the firing tips 50 are stored. Lower end 42 is generally closed, but it does include a number of gas openings 48 which allow pressurized gas to flow from an air tank 52 to the interior of part container 32; this air flow causes the firing tips 50 to float or lift off the bottom of the container. The terms "lift," "lifted," "lifting," etc., as used herein in connection with subjecting the firing tips in the part container to pressurized air, broadly refers to any movement, repositioning or agitation of the firing tips within the part container that facilitates acquisition of the firing tips by the firing tip welding assembly 16. The precise size, shape, pattern, arrangement, etc. of the gas openings 48 may vary depending on the particular application, but they should be large enough to accommodate a sufficient gas flow so that firing tips 50 can lift off the bottom surface of part container 32 without being so large that the firing tips fall through the openings. This could even include, for example, a number of gas openings joined or combined into one or more larger openings that permit the gas to flow through but prevent the firing tips from falling out. According to one non-limiting example, the firing tips 50 are small spheres or balls that are approximately 0.5 mm-2.0 mm in diameter and are made of iridium, platinum, palladium, other noble or precious metals, as well as alloys thereof. In this example, gas openings 48 are slightly smaller than firing tips 50. Of course, firing tips having other shapes (e.g., disks, chips, rivets, etc.), sizes and materials could be used instead, as the aforementioned only represent some of the possibilities.

Gas bubbler 34 is coupled to part container 32 and is designed to provide a gas stream to the lower end of the part container so that some of the firing tips 50 are lifted off of the bottom and at least temporarily float or reposition within the container. In the exemplary embodiment shown in FIG. 2, gas bubbler 34 includes an upper end 60 coupled to the lower end 42 of the part container, a lower end 62 coupled to a gas delivery hose 54, and a gas flow chamber 64 located between the upper and lower ends. The upper end 60 of the gas bubbler may be unitarily or integrally formed with the lower end 42 of the part container (as shown in FIG. 2), or they may be separate components that are attached to one another via threads, bolts or some other fastening mechanism. Lower end 62 may include any suitable coupler or connection piece 66 that allows for connection to gas delivery hose 54; this may include, for example, quick connects or other connection types. Gas flow chamber 64 is designed to convey gas from gas delivery hose 54 to the various gas openings 48 in a manner that distributes, agitates and/or otherwise disperses the gas to the interior of the part container 32. The gas flow chamber 64 may have any number of different configurations and features, including the frusto-conical configuration shown in FIG. 2 where an upper end has a larger width than a lower end, as well as any suitable combination of valves, nozzles, apertures or other devices that can influence or manipulate the flow of gas.

In order to prevent the firing tips 50 from oxidizing or otherwise corroding in part container 32, gas tank 52 and gas delivery hose 54 may provide firing tip storage assembly 12 with an inert gas such as argon, nitrogen or others. Although this is not necessary, inert gases can be useful in instances where firing tips 50 are made from certain precious or noble metal alloys that are susceptible to oxidation. The pressure in gas deliver hose 54 should be correlated to the mass, size, density, quantity, etc. of the precious metal firing tips 50 or the size of the gas openings 48, and should be significant enough to properly mix or float the tips without expulsing them out of the open end 40 of part container 32. Firing tip storage assembly 12 may further include any number of additional features and elements, including ones not specifically shown in the drawings. For example, gas delivery hose 54, gas bubbler 34 and/or part container 32 could include a valve mechanism of some type, such as a stopcock or flow regulator, in order to control the flow of gas to assembly 12. Or, in a different embodiment, gas deliver hose 54 and/or gas bubbler 34 may be coupled to a side of the part container 32, instead of only being coupled to the bottom. These are only some of the possibilities, as firing tip storage assembly 12 is not limited to the exemplary embodiments provided herein.

Turning now to FIG. 3, there is shown an enlarged cross-sectional view of a firing tip welding assembly 16. As previously mentioned, firing tip welding assembly 16 may be attached to robotic apparatus 14 so that the welding assembly can be quickly and accurately moved or indexed between firing tip storage assembly 12 and welding station 18; in this context, the firing tip welding assembly acts as a robot stylus. The firing tip welding assembly 16 is designed to pluck, seize or otherwise acquire a firing tip 50 from part container 32, hold onto the firing tip as the robotic apparatus 14 swivels or otherwise moves towards welding station 18, and then weld the firing tip to a spark plug electrode; all of this may be accomplished without having to transfer or hand-off the firing tip between successive devices (e.g., transferring the firing tip from a device that positions the tip to one that welds the tip). According to one potential embodiment, firing tip welding assembly 16 includes a welding electrode 70 and an attachment piece 72.

Welding electrode 70 is, as its name suggests, designed to weld firing tip 50 to a spark plug electrode, such as ground electrode 56. The welding electrode may be one of a number of suitable electrodes types, including a discharge electrode, a spot weld electrode, a tack weld electrode, or any other type of electrode that uses a combination of electrical current and applied force to attach firing tip 50 to the spark plug electrode. In this particular embodiment, welding electrode 70 is designed for use in a capacitive discharge welding application and is an elongated, hollow electrode that is made of a conductive material such as copper or a copper alloy that can convey the welding current. Welding electrode 70 may include an elongated body portion 80, a tip end 82, an attachment end 84, and a central passageway 86. Those skilled in the art will appreciate that welding electrode 70 can be a separate component from attachment piece 72 (as shown), or the two components can be unitarily or integrally formed with one another. One potential advantage of having two separate components is that when welding electrode 70 is worn out or damaged from use, it can be easily and cost-effectively replaced without having to replace the entire firing tip welding assembly 16.

Body portion 80, sometimes referred to as a "nib," may serve the dual purposes of grasping and welding a firing tip 50. The elongated and slender design (e.g., one that is between about 25 mm-75 mm in length) gives body portion 80 a sufficient reach so that it can more easily reach down into the open end 40 of part container 32 when attempting to pick up or grasp a firing tip, but also provides it with sufficient mass to handle and deliver the significant amounts of electrical current used during certain welding operations, such as capacitive discharge welding. In the particular embodiment shown in FIG. 3, elongated body portion 80 is tapered at the tip end 82 to provide a suitable welding surface and is threaded at the attachment end 84 so that it can be coupled to the attachment piece 72.

Tip end 82 is designed to hold a firing tip 50 in place, particularly a ball-shaped firing tip, while it is forced against a spark plug electrode or other work piece, so that the two components can be welded together. As best illustrated in FIGS. 3 and 4, tip end 82 is tapered and includes a ball seat 90 and a stepped portion 92. The ball seat 90 preferably includes a semi-spherical concave surface that is located at the distal end of tip end 82 and is sized and shaped to receive a complimentary spherical firing tip 50. The flared or stepped portion 92 is located in central passageway 86 and creates a passageway opening 94 that is generally smaller in size than central passageway 86. This is not necessary, however, as the tip end 82 may be provided according to any number of suitable embodiments so long as it can grasp and hold onto a desired firing tip, including non-spherical firing tips, and then weld them to a work piece. Tip end 82 can be unitarily or integrally formed with the rest of body portion 80, or it can be separately formed and attached to facilitate easy and inexpensive replacement when it wears out. In the event that tip end 82 is a separate component from the rest of the body portion 80, it may be formed of a different material specifically chosen for welding electrode applications.

Attachment end 84 facilitates attachment or connection of the welding electrode 70 to attachment piece 72. In the exemplary embodiment shown in FIG. 3, attachment end 84 is in both fluid and electrical communication with attachment piece 72 so that the welding electrode 70 can maintain a vacuum that holds onto the firing tip 50 while passing electrical current through the firing tip so that it is welded to the spark plug electrode. According to this particular embodiment, attachment end 84 has external threads that act as a male end and thread into a complimentary female end on attachment piece 72. Any suitable attachment or fastening mechanism (e.g., bolts, set screws, etc.) may be used, however, as the threaded arrangement shown in the drawing is just one possibility.

Central passageway 86 extends along the central or longitudinal axis of welding electrode 70 and is designed to convey or communicate the vacuum created by vacuum hose 150 to the welding electrode 70. Central passageway 86 may have a generally uniform inner diameter (as shown in FIG. 3), or it could change somewhat along its length. In the example illustrated here, central passageway 86 is a straight passageway or bore and has a generally uniform inner diameter (e.g., inner diameter of passageway 86 from about 1.0 mm-2.0 mm) along most of its length that is larger than the inner diameter of passageway opening 94 at the tip end 82 (e.g., inner diameter of opening from about 0.25 mm-0.75 mm), yet is smaller than the inner diameter of a central passageway in the attachment piece 72 (e.g., inner diameter of passageway 102 from about 1.25 mm-3.0 mm). Using central bores, passageways, openings, etc. with different inner diameters may be useful in manipulating or controlling the parameters of the vacuum that is created and can make certain manufacturing or machining operations easier. This varying inner diameter arrangement, however, is not necessary.

Attachment piece 72 couples the welding electrode 70 to the rest of the firing tip welding assembly 16, and may do so mechanically, fluidly and/or electrically. According to an exemplary embodiment, attachment piece 72 includes a mounting portion 100, a central passageway 102, and an electrical connection portion 104. Mounting portion 100 mechanically connects attachment piece 72 to the robotic apparatus 14 with bolts or any other suitable fastening mechanism, and is preferably non-conductive so that welding current is insulated from the robotic apparatus. In the particular embodiment shown in FIG. 3, the mounting portion 100 further includes an internal conductor 106 that electrically couples the electrical connection portion 104 to the welding electrode 70 so that welding current can be provided thereto, and an external sheathing 108 that electrically isolates or insulates the robotic apparatus 14 from such welding current. Central passageway 102 fluidly connects vacuum hose 150 with welding electrode 70 so that a sufficiently strong vacuum pressure is maintained at tip end 82 that will grasp and hold a firing tip 50, as already explained. Any type of suitable connection 152 may be used to couple central passageway 102 to vacuum hose 150, which in turn is coupled to a vacuum source 160; this includes connections that connect to a vacuum hose that extends from the side of the attachment piece 72, as opposed to its end. Electrical connection portion 104 electrically connects power supply lead 154 to attachment piece 72 so that welding current from power supply 162 can be provided via the power supply lead, the attachment piece, the welding electrode, the firing tip and into the spark plug electrode during welding. Skilled artisans will appreciate that the particulars surrounding electrical connection portion 104 will largely depend on the specific type of welding application that is being performed, but in an exemplary case the electrical connection portion is designed to accommodate a shunt cable 154 that delivers between 50 W/Sec-120 W/Sec for a capacitive discharge welding application.

Robotic apparatus 14 may include any type of robotic or automated equipment that can move or index firing tip welding assembly 16 between a firing tip loading position and a firing tip welding position. With reference to the schematic depiction in FIG. 1, robotic apparatus 14 controls the movement of firing tip welding assembly 16 from part container 32 to welding station 18. There are many types of suitable industrial robots that may be used with welding system 10 described herein, such as rectangular-, cylindrical-, or spherical-coordinate robots, articulated arm robots, gantry robots, SCARA robots, etc. Furthermore, robotic apparatus 14 may be either servo or non-servo controlled and could be programmed in different types of paths, such as a point-to-point path, a controlled path, or a continuous path, depending on the set up of the system. Robotic apparatus 14 may be driven by pneumatic, hydraulic and/or electrical means, and may utilize any type of suitable guidance, alignment or control systems, to cite several of the possibilities.

The aforementioned description of welding system 10 is non-limiting and is simply meant to describe one potential embodiment of such a system. Other embodiments, including those that differ significantly from that described here, may be used instead.

In operation, welding system 10 welds firing tips 50 to spark plug electrodes, such as a center electrode, a ground electrode or both. Beginning with a loading position where the robotic apparatus 14 has moved firing tip welding assembly 16 into position with firing tip storage assembly 12 (shown in phantom lines in FIG. 1), a vacuum-driven welding electrode 72 grabs or seizes a firing tip from part container 32. As previously explained, the part container 32 may be coupled to an inert gas supply 52 which supplies pressurized gas that causes the firing tips 50 to lift off of the bottom and float somewhat in the part container. This makes it easier for welding electrode 72, which has an open tip end 82 coupled to a vacuum source 160, to acquire and hold onto a firing tip 50. Once the welding system 10 determines that a firing tip 50 has been acquired (any suitable sensor, switch, systems, etc. may be used to detect the presence of a firing tip at the end of the welding electrode), robotic apparatus 14 swivels or otherwise moves the firing tip welding assembly 16, along with the acquired firing tip, from a loading position to a welding position.

Once the welding system 10 is in the welding position (shown in solid lines in FIG. 1), the robotic apparatus 14 extends or otherwise manipulates welding electrode 70 into position so that the acquired welding tip 50 can be pushed against and welded to spark plug electrode 56. If a capacitive discharge welding or pulse welding operation is used, then welding system 10 may include an additional shunt cable electrically connected to the spark plug electrode so that a welding circuit is completed. If a resistance welding operation is used, then welding system 10 may include an additional welding electrode positioned on the opposite of the spark plug electrode from the tip end 82 of the welding electrode 70. In either welding embodiment, the firing tip 50 is pushed against the spark plug electrode while power supply 162 provides a significant amount of welding current that flows through the work piece. This causes the firing tip 50 to become attached or joined to the spark plug electrode, without having to transfer the firing tip from an alignment or positioning device to a separate welding device, as in some conventional ball welding systems. It should be appreciated that welding system 10 is not limited to just capacitive discharge and resistance welding techniques, as this system may utilize any suitable welding process that involves the joining or coalescing of materials through the application of electrical current and pressure.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A welding system, comprising:
    a firing tip storage assembly having a gas bubbler fluidly coupled to a part container, the gas bubbler provides pressurized gas from a gas supply to the part container and the part container stores a plurality of firing tips; and
    a firing tip welding assembly having an attachment piece both fluidly and electrically coupled to a welding electrode, the attachment piece provides vacuum pressure from a vacuum source to the welding electrode and provides welding current from a power supply to the welding electrode;
    wherein the welding system is configured so that the pressurized gas lifts the plurality of firing tips within the part container while the welding electrode acquires one of the firing tips from the part container using the vacuum pressure.

2. The welding system of claim 1, wherein the plurality of firing tips are precious metal firing tips and the gas bubbler provides pressurized inert gas from the gas supply to the part container so that oxidation of the precious metal firing tips is minimized.

3. The welding system of claim 1, wherein the gas bubbler has a lower end, an upper end, and a gas flow chamber located between the lower and upper ends, and the gas flow chamber is configured to distribute, agitate or otherwise disperse the pressurized gas from the gas supply as it is provided from the gas bubbler to the part container through one or more gas openings.

4. The welding system of claim 3, wherein the lower end of the gas bubbler is connected to a gas delivery hose and provides the gas bubbler with the pressurized gas from the gas supply.

5. The welding system of claim 3, wherein the upper end of the gas bubbler is connected to a lower end of the part container that includes one or more gas openings so that the gas flow chamber is fluidly coupled to the interior of the part container through the one or more gas openings.

6. The welding system of claim 3, wherein the gas flow chamber has a frusto-conical shape so that the lower end of the gas bubbler has a smaller width than the upper end of the gas bubbler, and the frusto-conical shape is configured to better distribute, agitate or otherwise disperse the pressurized gas so that more of the plurality of firing tips are lifted within the interior of the part container.

7. The welding system of claim 1, wherein the part container has a lower end, an upper end, and sidewalls that connect the lower and upper ends together, and the lower end includes the one or more gas openings and the upper end is open to provide access to the interior of the part container.

8. The welding system of claim 7, wherein the one or more gas openings have a size or a shape that allows a sufficient amount of the pressurized gas to flow through and lift the plurality of firing tips within the interior of the part container, but also prevents the plurality of firing tips from falling through the one or more openings and out of the part container.

9. The welding system of claim 1, wherein the firing tip welding assembly further comprises:
    the attachment piece having a passageway fluidly coupled to the vacuum source, an electrical connection portion electrically coupled to the power supply, and a mounting portion configured for mechanically mounting the firing tip welding assembly to a robotic apparatus; and the welding electrode having an elongated body electrically coupled to the electrical connection portion, a slender tip end tapering from the elongated body, and a passageway with an opening fluidly coupled to the passageway of the attachment piece and located at the tip end of the welding electrode;

wherein the firing tip welding assembly is configured so that vacuum pressure for acquiring a firing tip is provided from the vacuum source to the opening at the slender tip end through the passageway of the attachment piece and the firing tip welding assembly is configured so that welding current for welding the firing tip to a spark plug electrode is provided from the power supply to the slender tip end of the welding electrode through the electrical connection portion in a manner that electrically isolates the mounting portion from the welding current.

10. The welding system of claim 9, wherein the attachment piece has an internal conductor that is electrically coupled to both the electrical connection portion and the welding electrode and an external sheathing that electrically isolates the internal conductor so that the attachment piece can provide welding current to the welding electrode while electrically isolating the robotic apparatus.

11. The welding system of claim 9, wherein the passageway of the attachment piece is larger than the passageway of the welding electrode so that the vacuum pressure is provided through a combined passageway that is stepped.

12. The welding system of claim 9, wherein the passageway of the welding electrode extends along a central axis of the welding electrode.

13. The welding system of claim 9, wherein the elongated, slender welding electrode tapers towards the tip end, and the tip end has a ball seat for engaging a spherical firing tip and an internal flared portion for restricting the size of the opening at an end of the passageway.

14. The welding system of claim 9, wherein the welding electrode has a threaded attachment end for threaded installation into the attachment piece so that the welding electrode can be replaced.

15. The welding system of claim 9, wherein the firing tip is a precious metal firing tip and the welding electrode is a capacitive discharge electrode designed for a capacitive discharge welding operation.

* * * * *